United States Patent [19]
Lobozzo

[11] Patent Number: 5,242,030
[45] Date of Patent: Sep. 7, 1993

[54] DEER STAND

[76] Inventor: Joseph E. Lobozzo, 22 Cornwall Rd., New Castle, Del. 19720

[21] Appl. No.: 858,897

[22] Filed: Mar. 27, 1992

[51] Int. Cl.⁵ .............................................. A01M 31/02
[52] U.S. Cl. ..................................... 182/187; 182/116; 182/129; 182/163; 182/20
[58] Field of Search ................ 182/187, 188, 116, 129, 182/20, 163

[56] References Cited

U.S. PATENT DOCUMENTS

| | | | |
|---|---|---|---|
| 3,282,375 | 11/1966 | Ray ................................... | 182/116 X |
| 3,336,999 | 8/1967 | McSwain . | |
| 4,045,040 | 8/1977 | Falls . | |
| 4,100,999 | 7/1978 | Conner ............................. | 182/187 X |
| 4,582,165 | 4/1986 | Latini ................................ | 182/20 |
| 4,614,252 | 9/1986 | Tarner ............................. | 182/187 X |
| 5,016,732 | 6/1991 | Dunn . | |
| 5,064,020 | 11/1991 | Eagleson .......................... | 182/187 X |

Primary Examiner—Alvin C. Chin-Shue
Attorney, Agent, or Firm—Richard C. Litman

[57] ABSTRACT

A hunting stand for use as an elevated observation platform and a game carrier. The stand is easily foldable in the form of a back pack and is convertible into a carrier to facilitate in the removal of game. The stand is comprised of a folding ladder having three successive sections joined together such that the three sections are selectively folded to form a back pack, to produce the carrier or to produce a fully extended ladder with adjoining observation platform. The stand is of lightweight unitary construction and has a unique hinge configuration that enables it to be selectively folded into a plurality of configurations with relative ease and provides a hunting stand which is easy to transport and store.

8 Claims, 4 Drawing Sheets

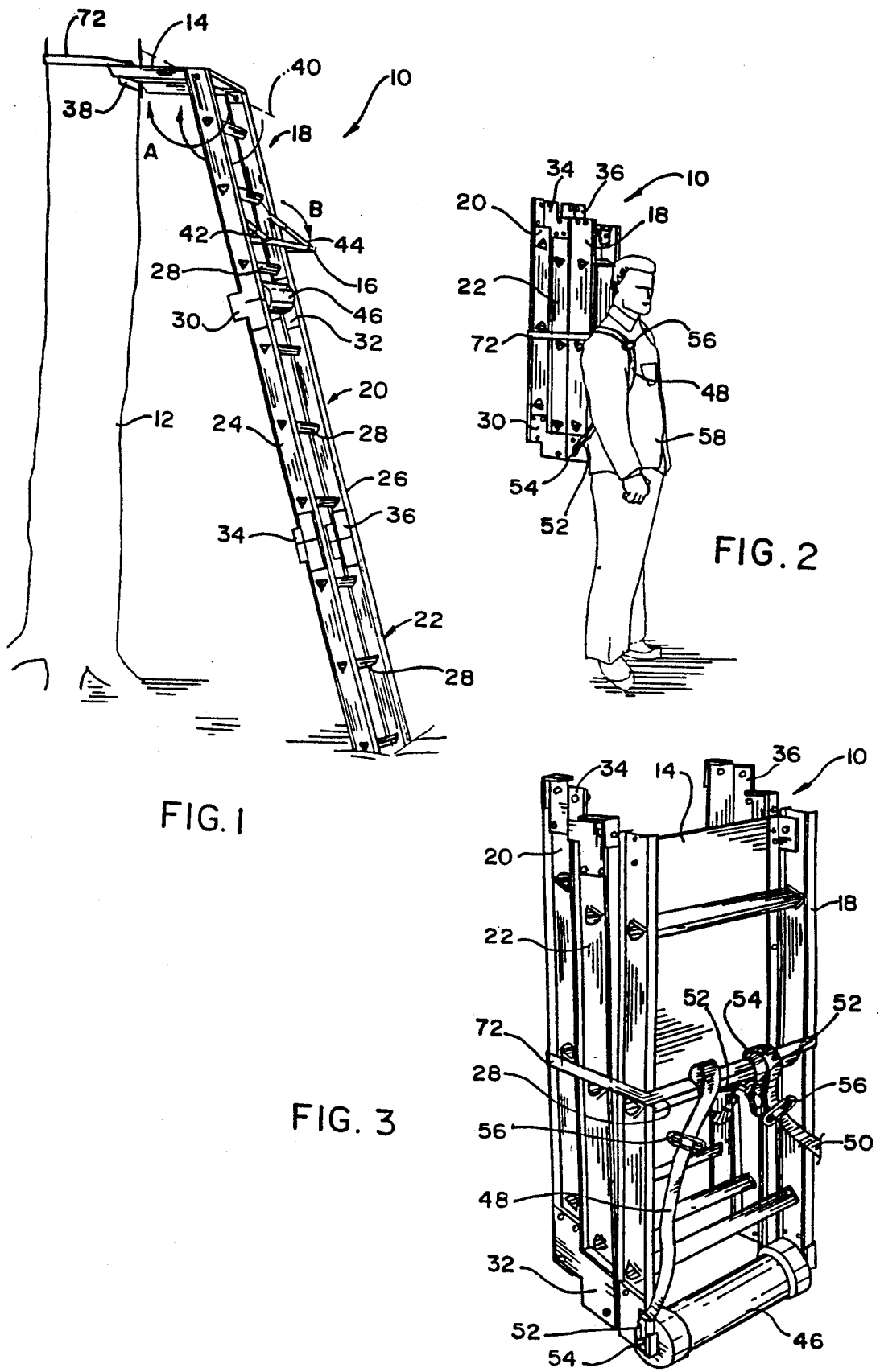

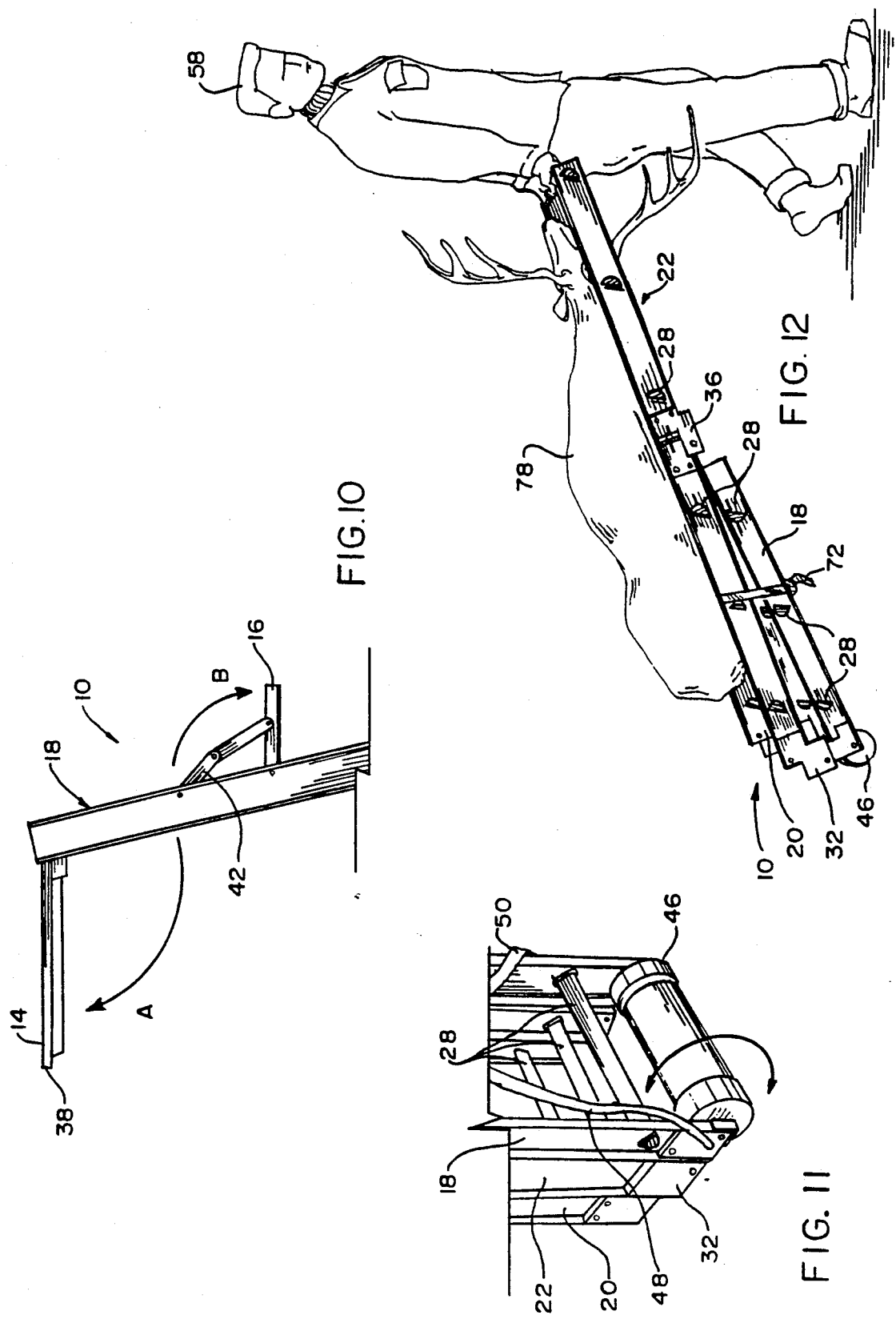

DEER STAND

BACKGROUND OF THE INVENTION

1. FIELD OF THE INVENTION

The present invention relates to a light weight, collapsible, compact portable deer stand and more particularly, a deer stand being of unitary construction which may be carried in the form of a back pack and may be used to as a carrier to transport game.

2. DESCRIPTION OF THE PRIOR ART

The use of an elevation platform is commonplace when hunting game and especially, when hunting deer. A permanently installed hunting stand or deer stand would be convenient. But on public and federal property, a permanent deer stand cannot be erected. Since many participants are not fortunate to own or rent prime hunting ground, the only option available is to utilize a portable deer stand.

Most deer stands currently available in a portable version must be carried to a hunting site and assembled prior to being erected against a tree or like object. The carrying of a disassembled stand can be quite cumbersome and can provide a great amount of discomfort to the user. Further, the assembly of some existing stands can prove to be difficult under well lit conditions and can become much more complicated when being erecting at dawn or when being dismantled at dusk when the lighting is insufficient, which is often the case. Existing stands even in their simplest form frequently produce noise during assembly with the rattle and clatter of the myriad of parts interacting with one another. This noise could possibly frighten away any game in the immediate vicinity, making your effort null and void.

Some versions require little in the way of assembly, but these stands are usually bulky and troublesome to transport. Few stands offer a provision for removing game. Hence, if one is fortunate to have killed some form of game, a decision must be drawn as to remove the carcass, leaving the stand behind to be later retrieved or to remove the stand and return later to retrieve the carcass. In either case, one assumes the risk of someone pilfering whatever you choose to leave behind. There are stands which require little by way of assembly. Some stands are compact and relatively simple to transport and some assist in the removal of the game. However, none of the existing deer stands are of a light weight unitary construction, being collapsible into a compact form, being easy to transport, being convertible into a game carrier, as well as being simple to erect and take down while at the same time producing a nominal amount of clamor throughout the process, even under poorly illuminated environmental conditions.

U.S. Pat. No. 3,336,999 issued Aug. 22, 1967 to Thad M. McSwain discloses a hunting stand which includes a ladder supporting a platform at its upper end. The platform is releasably fastened to the periphery of a tree by a toggle-type clamp. The ladder is foldable in an accordion fashion to produce a compact portable structure. The hunting stand may also be converted into a skid having a rotatably attached wheel thereon to facilitate in the removal of game.

U.S. Pat. No. 4,045,040 issued Aug. 30, 1977 to Hershell W. Fails describes a deer stand and game carrier. The deer stand includes a collapsible ladder assembly which is set up in the form of a tripod to support an elevated observation seat. In its collapsed form, the top end of the deer stand is releasably anchored to the user's back while the bottom end of the deer stand is provided with a plurality of wheels. This enables the deer stand to be pulled behind the user while leaving the user's hands free to perform other functions. The deer stand serves as a carrier to assist in the removal of a carcass.

U.S. Pat. No. 5,016,732 issued May 21, 1991 to Stewart A. Dunn discloses a portable observation and hunting stand having an upper and lower ladder section and a combined seat and standing platform section. The three sections are telescopically joined together and the combined seat and standing platform section is engageable with a tree or like object to form the observation and hunting stand in its erected form. The stand is collapsible in the form of a back pack and is also provided with a skid to aid in the removal of game.

None of the above inventions and patents, taken either singly or in combination, is seen to describe the instant invention as claimed.

SUMMARY OF THE INVENTION

The present invention relates to a hunting stand or a deer stand. The stand is of unitary construction and is preferably fabricated from a light weight material, such as aluminum or fiberglass. The stand includes a folding ladder assembly having three sections successively joined together by hinge elements. The stand is provided with a pair of elevated observation platforms, one where a user may stand and one where the user may be seated. The platform where the user may be seated is pivotally mounted to an uppermost end of the folding ladder assembly and includes a V-shaped abutment edge which is engageable with the outer periphery of the tree. The standing platform is pivotally attached to the folding ladder assembly a predetermined distance from the uppermost end thereof. The pivotal displacement of both platforms is limited to ensure that both of the same will provide rigid support for the user. The stand may also be selectively folded in the form of a back pack or to produce a carrier for the removal of game. The stand is equipped with a pair of adjustable shoulder straps which enable the stand in its back pack form to be snugly mounted on the user's back. A roller assembly is rotatably attached to the stand to enable the carrier and the carcass thereon to be transported with relative ease.

Accordingly, it is a principal object of the invention to provide a light weight, collapsible, compact, portable deer stand being of unitary construction and being easily transported by the user.

It is another object of the invention to provide a deer stand which is easily erected, producing little commotion and requiring a negligible amount of lighting, and is easily folded up in the form of either a compact back pack or in the form of a game carrier to assist in the removal of game.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is an environmental perspective view of the present invention being employed as an observation platform.

FIG. 2 is an environmental perspective view of the present invention being carried in the form of a back pack.

FIG. 3 is a perspective view of the present invention completely folded in the form of a back pack.

FIG. 10 a partial side elevational view of the present invention showing both the observation platform and the standing platform.

FIG. 11 is a detail view of the roller assembly.

FIG. 12 is an environmental perspective view of the present invention in the form of a cart to facilitate in the removal of a carcass.

Similar reference characters denote corresponding features consistently throughout the attached drawings.

DETAILED DESCRIPTION OF THE PREFERRED EMBODIMENT

Figure 4:
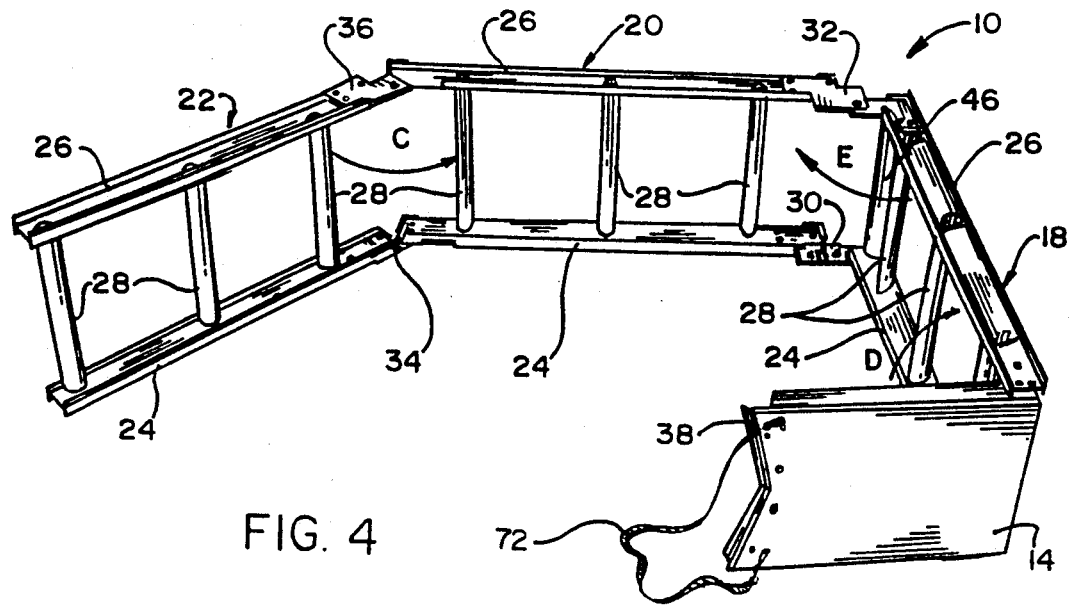
FIG. 4 is a perspective view of the present invention shown in a partially extended posture.

Now referring to the drawings, FIG. 1 shows the folding deer stand or hunting stand 10 in a completely extended posture. The stand 10 embraces a tree 12 to provide an observation platform 14 in which the user 58 (not shown) may be seated and a standing platform 16 (also shown in FIG. 10) in which the user 58 may stand. The deer stand 10 is comprised of a folding ladder assembly which includes an uppermost section 18, an intermediate section 20 and a lower section 22. Each section 18,20,22 includes both a left and right spaced apart outer rail component 24,26 separated by a plurality of rungs 28 having opposing ends which are transversely connected to the left and right outer rails, respectively. Each of the rungs 28 are spaced equidistantly apart. Left and right uppermost hinges 30,32 pivotally join the uppermost section 18 to the intermediate section 20. Left and right lower hinges 34,36 pivotally join the intermediate section 20 to the lower section 22. The observation platform 14 is pivotally mounted to an uppermost end of the uppermost section 18 and has a V-shaped abutment edge which engages with the outer periphery of the tree 12. The observation platform 14 is pivotally rotatable about an axis 40 which is parallel spaced from the abutment edge 38. This rotation offers relatively limited displacement in the direction A from a position parallel to and juxtaposed to the upper section 18. This limited displacement ensures that the observation platform 14 will provide rigid support for the user 58 (not shown) to be seated. The standing platform 16 (also shown in FIG. 10) is pivotally attached the uppermost section 18 a predetermined distance from the uppermost end thereof. The standing platform 16 includes left and right foldable member 42,44 which limit the rotation of the standing platform in the direction B.

A roller assembly 46 (also shown in FIG. 11) is rotatably attached between the left and right outer rails 24,26 of the uppermost section 18 adjacent the left and right uppermost hinges 30,32.

FIGS. 2 and 3 show the deer stand 10 in a completely folded posture. The uppermost left and right hinges 30,32 and the lower left and right hinges 34,36 are configured to permit the lower section 22 to be folded in between the uppermost section 18 and the intermediate section 20 to form the back pack shown. When folded in this manner, the observation platform 14 is retained between the lower section 22 and the uppermost section 18. The deer stand 10 includes both left and right shoulder straps 48,50, each having a first end releasably attachable to the left and right uppermost hinges 30,32, respectively, and each having a second end releasably attached to a central point of an uppermost rung 28 such that the two second ends converge. Each end of each shoulder strap 48,50 has attached thereon a snap-hook fastener 52 which is engageable with a respective eye-hook 54. Each shoulder strap 48,50 is also provided with an adjustment device 56 attached thereon to allow the user 58 to bias each shoulder strap 48,50 independently to snugly secure said deer stand 10 (in its back pack configuration) to the user's 58 back.

FIG. 4 shows the deer stand 10 partially extended. By folding the lower section 22 in the direction C, folding the observation platform 14 in the direction D and folding the uppermost section 18 in the direction E in succession, the deer stand 10 is formed in the shape of the back pack shown in FIGS. 2 and 3. By unfolding the deer stand 10 in reverse of the aforementioned order, the combined ladder assembly and observation platform 14 are produced. By folding the observation platform 14 in the direction D and the uppermost section 18 in the direction E in succession, the carrier shown in FIG. 12 is produced.

Figure 5:
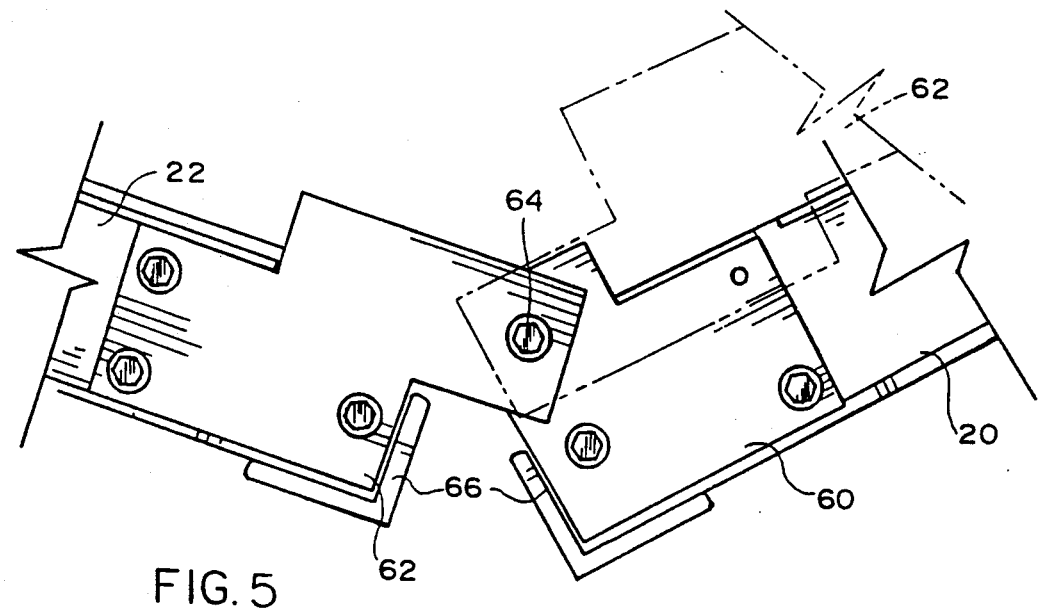
FIG. 5 is a detail view of the lower hinge in a partially extended posture.
Figure 6:
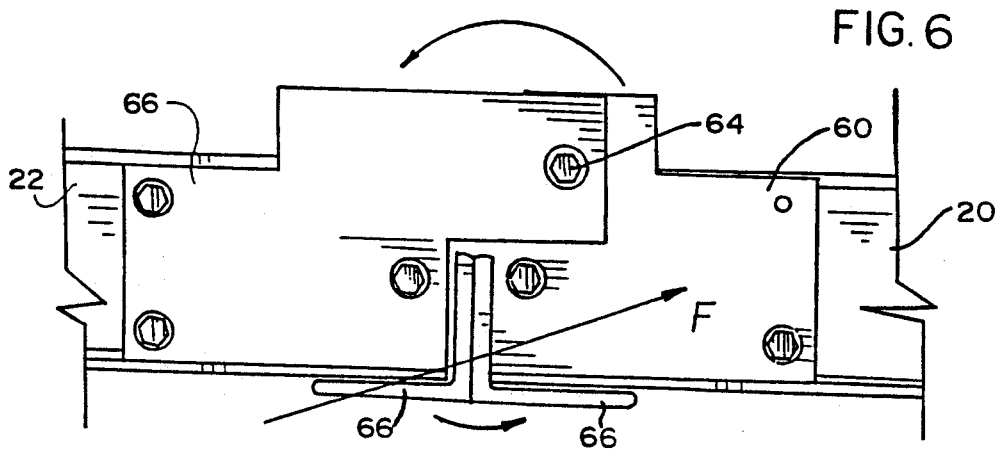
FIG. 6 is a detail view of the lower hinge in a completely extended posture.

FIGS. 5 and 6 show the right lower hinge 36, the left lower hinge 34 (not shown) being a mirror thereof. The lower hinge 36 is comprised of an L-shaped planar member 60 and a Z-shaped planar member 62 pivotally together joined by a fastener 64. The L-shaped member 60 is secured to a lower end of the intermediate section 20 and the Z-shaped member 62 is secured to an uppermost end of the lower section 22 such that the two sections 20,22 are folded substantially parallel and juxtaposed one to the other. The L-shape member 60 and the Z-shaped member 62 are each provided with a piece of angle stock 66. When the deer stand 10 is fully extended and erected against the tree 12, the two pieces of angle stock 66 provide a contact surface for one another and the gravitational force F as well as the weight of the user 58 each prevent the two pieces 66 from disengaging and thus, prevent the deer stand 10 from collapsing.

Figure 7:
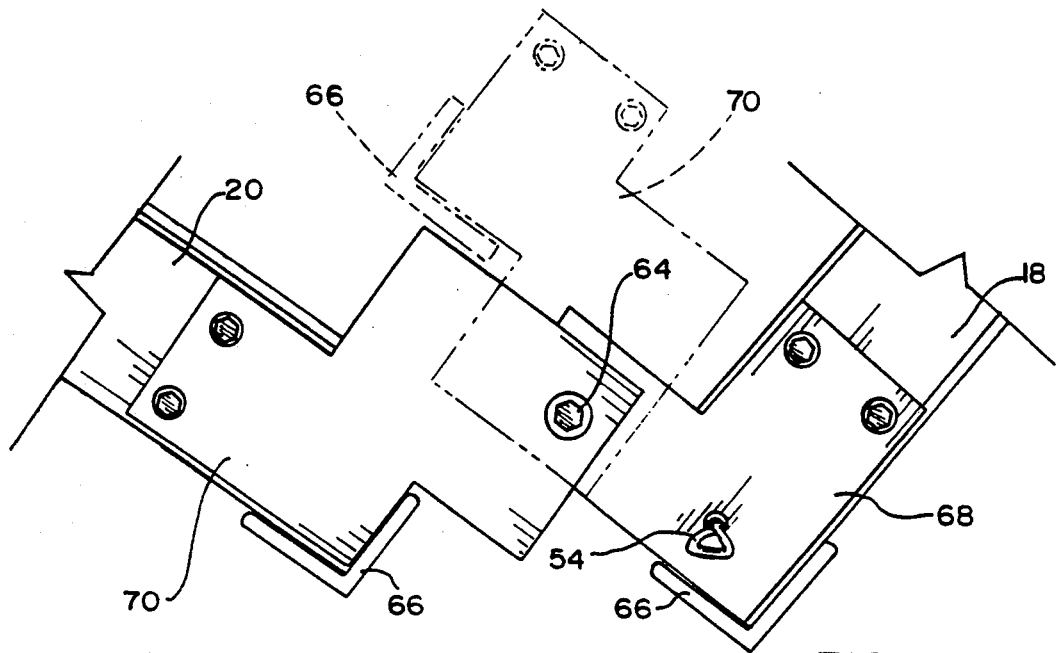
FIG. 7 is a detail view of the uppermost hinge in a partially extended posture.
Figure 8:
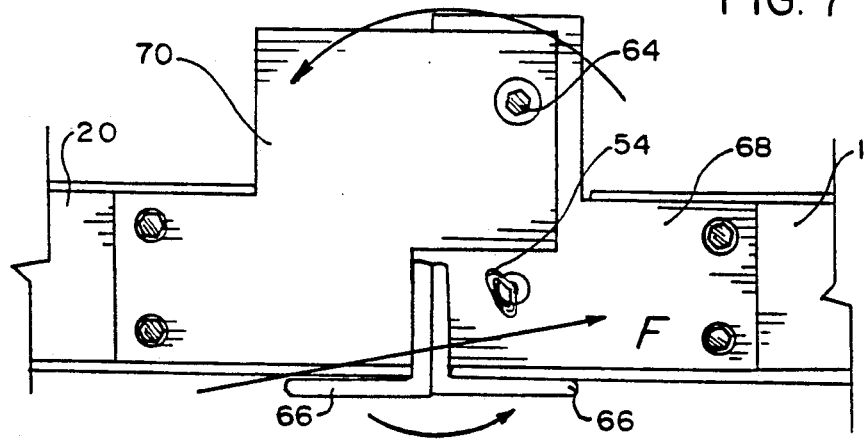
FIG. 8 is a detail view of the uppermost hinge in a completely extended posture.

The right uppermost hinge 32 of FIGS. 7 and 8 is similar to that of the right lower hinge 36 shown in FIGS. 5 and 6, the left uppermost hinge 30 (not shown) being a mirror thereof. The uppermost hinge 32 is also comprised of an L-shaped planar member 68 and a Z-shaped planar member 70 pivotally joined together by a fastener 64. The L-shaped member 68 is secured to a lower end of the uppermost section 18 and the Z-shaped member 70 is secured to an uppermost end of the intermediate section 20 such that the two sections 18,20 are folded to provide a gap for the lower section 22 (not shown) to be folded therebetween. As with the lower hinges 34,36, the L-shape member 68 and the Z-shaped member 70 of the uppermost hinges 30,32 are each provided with a piece of angle stock 66. Again, when the deer stand 10 is fully extended and erected against the tree 12, the two pieces of angle stock 66 provide a contact surface for one another and the gravitational force F as well as the weight of the user 58 each prevent the two pieces 66 from disengaging and thus, prevent the deer stand 10 from collapsing.

Figure 9:
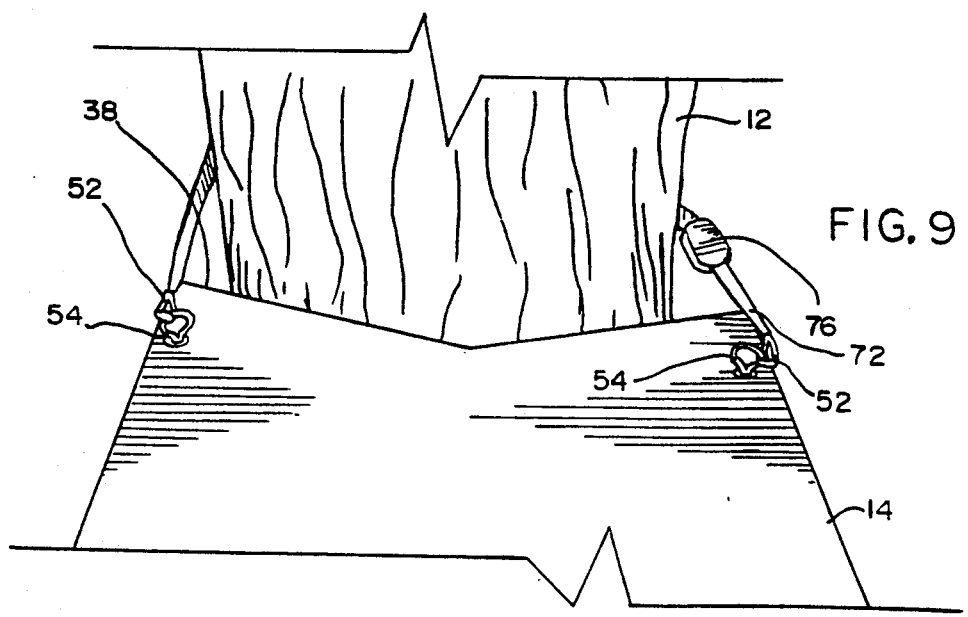
FIG. 9 is an broken environmental perspective view of the observation platform embracing a tree.

FIG. 9 shows the observation platform 14 secured to the outer periphery of the tree 12. A restraint strap 72 is fastened to each side of the observation platform 14 and embraces the tree 12. The restraint strap 72 has two ends, each of which is provided with a snap-hook fastener 52. The snap-hook fasteners 52 are fastened to respective eye-hooks 54 which are located on each side of the observation platform 14 adjacent an abutment edge 38 thereof which engages with the outer periphery of the tree 12. The restraint strap 72 is further provided with a toggle clamp 76 which enables the user 58 to tighten the restraint strap 72 around the tree 12. The toggle clamp 76 is of the conventional type having a set of teeth which engage with the restraint strap 72 to hold the restraint strap 72 taut against the tree 12. The restraint strap 72 also maintains the deer stand 10 in a selectively folded posture, either in the form of the back pack shown in FIGS. 2 and 3 or in form of the carrier shown in FIG. 12.

FIG. 12 shows the deer stand 10 being used as a carrier to facilitate in the transportation of a carcass 78. The carrier is produced by selectivity folding the deer stand 10 such that the intermediate section 20 and the lower section 22 are fully extended and the upper section 18 is folded and strapped against a back side of the intermediated section 20 via the restraint strap 72. The weight of the carcass 78 and the configuration of each lower hinges 34,36 keep the left and right outer rails 24,26 of the intermediate and lower sections 20,22 axially aligned.

It is to be understood that the present invention is not limited to the sole embodiment described above, but encompasses any and all embodiments within the scope of the following claims.

I claim:

1. A hunting stand comprising:
  a) a folding ladder assembly having an uppermost section, an intermediate section and a lower section successively joined together, said folding ladder assembly further includes an uppermost hinge for pivotally joining said uppermost section to said intermediate section and a lower hinge for pivotally joining said intermediate section to said lower section;
  b) a platform assembly being pivotally mounted to an uppermost end of said ladder assembly for supporting a user;
  c) shoulder straps being attached to said folding ladder assembly to facilitate in the carrying of said hunting stand in a back pack configuration;
  d) restraint strap means being attached to said platform for embracing a tree and for clamping said folding ladder assembly in a selectively folded posture whereby said hunting stand may be completely unfolded to produce said hunting stand and said platform assembly, may be partially unfolded to produce a game carrier, and may be completely folded by folding said lower section in between said uppermost and intermediate sections to produce said back pack configuration;
  e) a standing platform being pivotally attached to said folding ladder assembly a predetermined distance from an uppermost end of said folding ladder assembly for supporting the user thereon; and
  f) a roller assembly being rotatably attached to said folding ladder assembly a predetermined distance from said uppermost end of said folding ladder assembly to provide mobility for said game carrier.

2. The hunting stand according to claim 1, wherein said folding ladder includes said uppermost section comprises left and right outer rail components separated by a plurality of rungs having opposing ends transversely connected to said left and right rails, each one of said rungs spaced equidistantly apart, said intermediate section comprises left and right outer rail components separated by a plurality of rungs having opposing ends transversely connected to said left and right rails, each one of said rungs spaced equidistantly apart, and said lower section comprises left and right outer rail components separated by a plurality of rungs having opposing ends transversely connected to said left and right rails, each one of said rungs spaced equidistantly apart.

3. The hunting stand according to claim 1, wherein said platform assembly has a V-shaped abutment edge to engage with the tree.

4. The hunting stand according to claim 1, wherein said shoulder straps each include means for engaging and disengaging said shoulder strap with said folding ladder assembly to facilitate in the removal of said shoulder straps from said folding ladder assembly.

5. The hunting stand according to claim 1, wherein said shoulder straps each further include means for biasing said shoulder strap to snugly secure said hunting stand said back pack configuration to the user's back.

6. The hunting stand according to claim 1, wherein said restraint strap includes means for engaging and disengaging said restraint strap to facilitate in the removal of said restraint strap, thus enabling said restraint strap to encircle the tree.

7. The hunting stand according to claim 1, wherein said restraint strap further comprises means for biasing said restraint strap such that said restraint strap can be pulled taut to tightly engage said platform assembly against the tree and to maintain said hunting stand in a selectively folded posture.

8. A folding hunting stand comprising:
  a) a folding ladder assembly including:
    1) an uppermost section comprising left and right spaced apart outer rail components separated by a plurality of rungs having opposing ends transversely connected to said left and right outer rails, each one of said rungs spaced equidistantly apart;
    2) an intermediate section comprising left and right spaced apart outer rail components separated by a plurality of rungs having opposing ends transversely connected to said left and right outer rails, each one of said rungs spaced equidistantly apart;
    3) a lower section comprising left and right spaced apart outer rail components separated by a plurality of rungs having opposing ends transversely connected to said left and right outer rails, each one of said rungs spaced equidistantly apart;
    4) a left and right lower hinge for pivotally joining said intermediate section to said lower section, said left and right lower hinges each having a pivot point which enables said lower and said intermediate sections to be folded parallel and juxtaposed to one another;

5) a left and right uppermost hinge for pivotally joining said uppermost section to said intermediate section, said left and right uppermost hinges each having a pivot point which provides a gap between said upper section and said intermediate section when folded parallel to one another, said gap being a predetermined distance whereby said lower section is selectively folded in between and parallel to said upper and said intermediate sections to form a back pack configuration;

b) an observation platform being pivotally mounted to an uppermost end of said ladder assembly and having a V-shaped abutment edge, said observation platform being pivotally rotatable about an axis parallel spaced from said abutment edge and offering a relatively limited amount of displacement in one direction from a position parallel to and juxtaposed to said upper section to ensure a proper engagement of said observation platform against a tree and thus ensuring rigid support of the user;

c) a standing platform being pivotally attached to said ladder assembly a predetermined distance from said upper most end and being disposed between said left and right outer rails of said uppermost section of said folding ladder assembly;

d) a roller assembly being disposed on said uppermost section adjacent to said uppermost hinge and being disposed between said left and right outer rails of said uppermost section;

e) shoulder straps being attached to said ladder assembly for carrying said hunting stand in said back pack configuration;

f) means for engaging and disengaging said shoulder strap to facilitate in the removal of said shoulder strap from said folding ladder assembly;

g) means for biasing said shoulder strap to snugly secure said hunting stand said back pack configuration to the user's back;

h) a restraint strap being fastened to said observation platform for securing said observation platform against the tree and for maintaining said ladder assembly in a selectively folded posture;

i) means for engaging and disengaging said restraint strap to facilitate in the removal of said restraint strap from said observation platform and thus enabling the user to encircle the tree with said restraint strap; and j) means for biasing said restraint strap to pull said restraint strap taut and thus engaging said observation platform tightly against the tree and for maintaining said hunting stand in a selectively folded posture.

* * * * *